United States Patent [19]

Domesle et al.

[11] Patent Number: 5,707,574
[45] Date of Patent: Jan. 13, 1998

[54] METHOD FOR THE UNILATERAL OR BILATERAL SEALING OR FILLING OF FLOW CHANNELS IN AN ANNULAR ZONE OF A CYLINDRICAL HONEYCOMB BODY

[75] Inventors: Rainer Domesle, Alzenau, Germany; Bernd Engler, White Plains, N.Y.; Wolfgang Kuhl; Egbert Lox, both of Hanau, Germany; Oliver Fehnle, Rheinfelden, Germany; Walter Leibold, Steinau-Ulmbach, Germany

[73] Assignee: Degussa Aktiengesellschaft, Frankfurt am Main, Germany

[21] Appl. No.: 498,060

[22] Filed: Jul. 5, 1995

[30] Foreign Application Priority Data

Jul. 8, 1994 [DE] Germany ............. 44 24 019.8

[51] Int. Cl.⁶ .................................. C04B 33/34
[52] U.S. Cl. ............................... 264/60; 264/62
[58] Field of Search ......................... 264/60, 62

[56] References Cited

U.S. PATENT DOCUMENTS

| | | | |
|---|---|---|---|
| 4,329,162 | 5/1982 | Pitcher, Jr. ................. | 55/523 |
| 4,557,773 | 12/1985 | Bonzo ....................... | 156/64 |
| 4,857,245 | 8/1989 | Oshima ...................... | 264/25 |
| 5,219,667 | 6/1993 | Hampton ..................... | 428/593 |
| 5,364,573 | 11/1994 | Noky ........................ | 264/40.1 |
| 5,433,904 | 7/1995 | Noky ........................ | 264/40.1 |
| 5,498,288 | 3/1996 | Noky ........................ | 118/305 |
| 5,514,446 | 5/1996 | Machida ..................... | 428/116 |
| 5,516,494 | 5/1996 | Domesle ..................... | 427/243 |

FOREIGN PATENT DOCUMENTS

| | | |
|---|---|---|
| 31 09 314 | 1/1982 | Germany . |
| 31 09 314 | 8/1985 | Germany . |
| 42 36 883 | 9/1993 | Germany . |
| 42 38 120 | 3/1994 | Germany . |
| 5-63206 | 9/1993 | Japan . |
| 2 071 640 | 9/1981 | United Kingdom . |

*Primary Examiner*—Timothy Speer
*Attorney, Agent, or Firm*—Beveridge, DeGrandi, Weilacher & Young, L.L.P.

[57] ABSTRACT

A method for the sealing of flow channels in an annular zone of a cylindrical honeycomb body. The sealing of the flow channels takes place by introduction of a ceramic compound into the flow channels by means of a nozzle, wherein nozzle and honeycomb body are moved relative to one another with simultaneous guiding of the nozzle past the lateral surface and/or past the end face contour of the honeycomb body.

11 Claims, 2 Drawing Sheets

5,707,574

METHOD FOR THE UNILATERAL OR BILATERAL SEALING OR FILLING OF FLOW CHANNELS IN AN ANNULAR ZONE OF A CYLINDRICAL HONEYCOMB BODY

INTRODUCTION AND BACKGROUND

The present invention relates to a method for the unilateral or bilateral sealing or filling of flow channels in an annular zone of a cylindrical honeycomb body.

Monolithic honeycomb bodies are used in automotive exhaust gas catalysis as support elements for the catalytically active coating. These support elements usually possess a generally cylindrical form with an enveloping lateral surface and two cross-sectional or end faces as inlet and outlet faces for the exhaust gases which go through the structures to be purified. The cross-sectional form of the support elements can be varied within wide limits to the spatial requirements of the motor vehicle to which they are fitted. Thus, for example, circular, elliptical, square, rectangular, triangular and asymmetrical end face cross-sections of the support elements are known.

The cylindrical honeycomb bodies, with any end face contour, possess parallel flow channels for the exhaust gases to pass through in order to be purified. The flow channels form, on the end faces of the honeycomb bodies, a cellular structure with a cell density between 5 and 200 cells/cm$^2$ depending on the application. Typical honeycomb bodies for the purification of exhaust gas from passenger cars possess, for example, a length of some 150 mm, a diameter of 100 mm, and a cell density of 62 cells/cm$^2$. The wall thickness of the flow channels comes in this case to 0.16 mm. The honeycomb bodies can be extruded ceramic honeycomb bodies or metal honeycomb bodies.

The ceramic honeycomb bodies usually comprise flow channels of square cross-section which are arranged regularly, whereas the flow channels of the metal honeycomb bodies can exhibit channel cross-sections of varying shapes depending on the type of construction.

If these honeycomb bodies are used as support elements for the catalytically active components, for example in automotive exhaust gas catalysis, the inner walls of the flow channels are first of all lined with a fine-particle coating of heat-resistant metal oxides which possess a high specific surface. Suitable metal oxides are, for example, γ-aluminum oxide, titanium oxide, silicon oxide, cerium oxide, and various zeolites or mixtures thereof, wherein the metal oxides can also be doped with, for example, rare-earth oxides for temperature stabilization. The specific surface of these high-surface metal oxides is conventionally more than 10 m$^2$/g and in particular between 50 and 400 m$^2$/g.

For the application of the high-surface metal oxide coating the honeycomb bodies are, for example, flooded with an aqueous coating dispersion of the fine-particle metal oxides. The flow channels are then freed of surplus coating dispersion by blowing out with compressed air. This is referred to in the art as the deposition of the "wash coat".

There can then further be deposited on the large surface of the metal oxide coating catalytically active noble metal components in finely dispersed form, preferably metals of the platinum group, for example by impregnating with aqueous solutions of soluble compounds of these metals unless the latter have already been added to the coating dispersion. After the coating, the coating is dried conventionally and optionally calcined for curing and improvement of the adhesion.

For the applications in exhaust gas purification it can be advantageous if the flow channels of the honeycomb bodies which are located in an annular zone, in particular an edge zone, are sealed or plugged on one or both sides from the end faces or filled completely over the whole length of the honeycomb body.

DE 31 09 314 C2 (GB 2,071,640) describes ceramic honeycomb bodies which are reinforced in their mechanical stability by filling of the flow channels in an edge zone of the bodies with a ceramic compound. The flow channels can be filled with the ceramic material over their entire length or only on sections. The sections extend into the honeycomb bodies from the two end faces up to a certain depth. DE 31 09 314 describes as suitable ceramic materials cordierite, mullite or pourable fire-resistant materials such as aluminum oxide cement. In order that only the flow channels lying in the edge zone of the honeycomb body are filled with the ceramic filling material, the remaining flow channels are covered by a covering mask of plastics material.

DE 42 36 883 A1 describes a catalyst whose thermal radiation is reduced in an outward direction by the flow channels being sealed in a peripheral edge zone of the catalyst body either on the upstream side or on the upstream and downstream side. DE 42 36 883 provides no information on how the flow channels can be sealed or with what material this is to be done.

JP-AS 5-63206 describes a method for sealing the flow channels of honeycomb bodies in an edge zone in which a ceramic compound is brushed into the flow channels from both sides with a small brush. The edge zone has a width of up to 3 mm. In so doing the flow channels are filled to a depth of about 3 mm. The aim of this measure is to seal those flow channels which on the fitting of the honeycomb body into the exhaust system of an automobile are covered by essential holding elements and therefore cannot be used for the purification of the exhaust gas. By sealing these flow channels prior to the application of the catalyst coating, valuable catalytically active material is economized on.

SUMMARY OF THE INVENTION

One object of the present invention is to provide a method which permits a clean and economical sealing or filling of flow channels in an annular zone of a cylindrical honeycomb body which is bounded by an inlet and an outlet face as well as by an enveloping lateral surface. This and other objects are achieved by the introduction of a ceramic compound into the flow channels by means of at least one nozzle, wherein nozzle and honeycomb body are moved relative to one another with simultaneous guiding of the nozzle directly or indirectly past the lateral surface and/or past the end face contour.

BRIEF DESCRIPTION OF THE DRAWINGS

The present invention will be further understood with reference to the drawings, wherein.

DETAILED DESCRIPTION OF THE INVENTION

Figure 1:
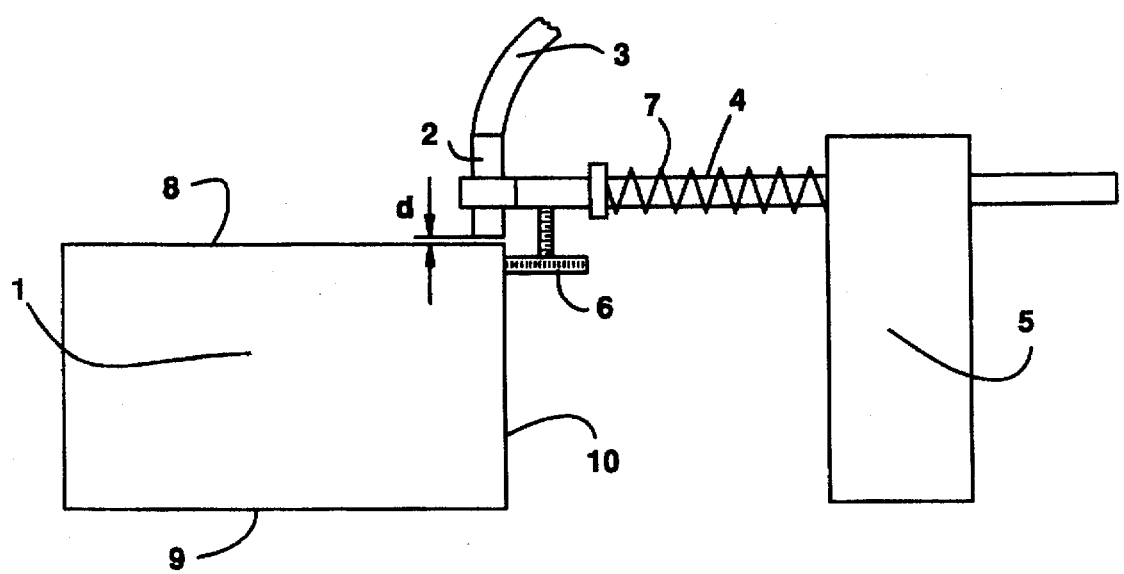
FIG. 1 is a schematic side view of a honeycomb body with mounted nozzle for the sealing of the flow channels in the edge zone.
Figure 2:
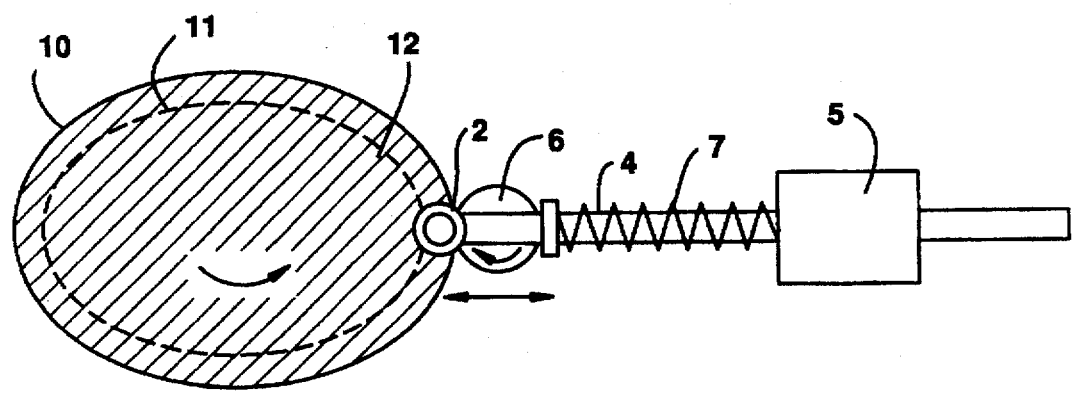
FIG. 2 is a schematic overhead view onto the arrangement of FIG. 1.

FIGS. 1 and 2 show an arrangement for carrying out the method according to the present invention in a schematic side view (FIG. 1) and in a schematic overhead view (FIG. 2). A ceramic honeycomb body 1 with oval cross-section and square flow channels is shown in FIG. 1. The honeycomb body is bounded by its lateral surface 10 and the two end faces 8 and 9 which in operation of the catalyst system form the inlet and outlet faces for the exhaust gases to be purified.

The nozzle 2 is for the sealing of the flow channels in the edge zone 11 of the honeycomb body and is guided past the end face 8 up to the clearance d above the body. The nozzle is supported by the guide rod 4 horizontally adjustable in the bearing pedestal 5. By means of the spring 7, the guide wheel 6 is, on rotation of the honeycomb body about its cylinder axis, pressed constantly against the lateral surface 10. The nozzle 2 is supplied via the flexible tube 3 With the ceramic compound for the sealing of the flow channels. The darkened part 12 of the annular zone 11 indicates the flow channels already sealed. Instead of the single guide wheel 6 shown, two drive pinions, which for example form an equal-sided triangle with the nozzle center, can also be used. Likewise, it is possible to replace the guide wheel by a bolt or sliding shoe.

Figure 3:
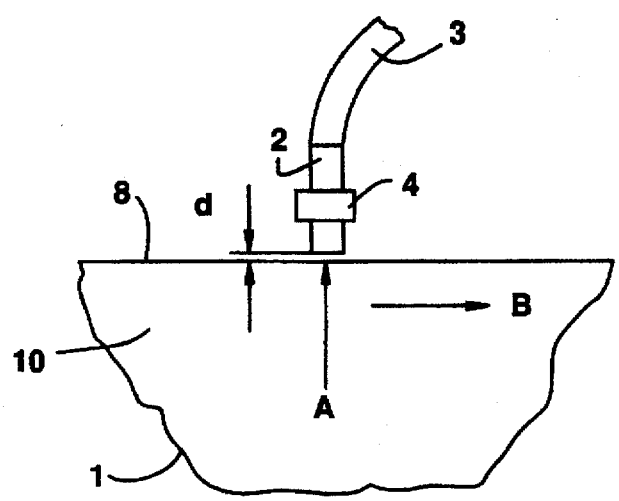
FIG. 3 is a schematic view of a cut-out from FIG. 1.
Figure 3A:
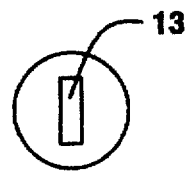
FIG. 3A is an enlarged view of the nozzle end.

FIG. 3 shows a cut-out from FIG. 1 with the nozzle arrangement from the viewing direction of the bearing pedestal 5 with removed guide wheel 6. FIG. 3A is an enlarged view A onto the end of the nozzle Z with a rectangular-shaped nozzle opening 13. The arrow B indicates the direction of motion of the honeycomb body.

Figure 4:
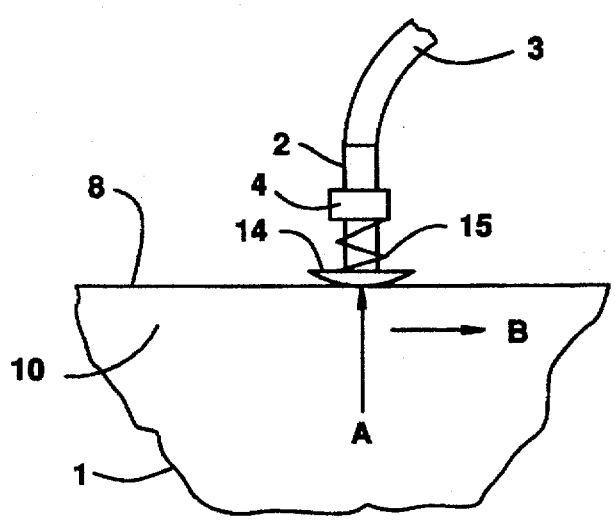
FIG. 4 is a schematic view of a cut-out of an alternative form of the device based on the present invention.
Figure 4A:
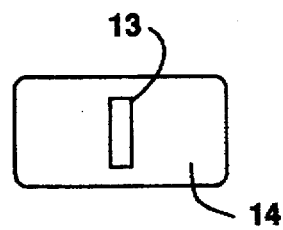
FIG. 4A is an enlarged view of the nozzle end with a sliding shoe.

FIG. 4 shows a similar representation as FIG. 3 with an alternative embodiment of the nozzle. The nozzle end is constructed as a sliding shoe 14 and is spring-mounted on the end face 8. To this end the nozzle is supported so as to be vertically displaceable in the guide rod 4 and is pressed lightly onto the end face 8 by the spring 15.

The nozzle is for the sealing of the flow channels and is guided past the inlet or outlet face of the honeycomb body. A small clearance is suitably maintained between nozzle end and the respective end face of the honeycomb body in order to prevent damage to the honeycomb body during relative movement between nozzle and honeycomb body. The size of the clearance depends on the evenness of the inlet or outlet face of the honeycomb body and on the consistency of the ceramic compound. Usually the suitable clearance is between 0.1 and 1 mm and is indicated at "d" in FIG. 1.

Alternatively, the nozzle end can be in the form of a sliding shoe and of optionally spring-mounting the nozzle on the inlet or outlet face of the honeycomb body. There is therefore the possibility of also balancing out serious roughness of the end faces of the honeycomb body and of preventing different degrees of application of the ceramic compound.

The nozzle opening can be constructed to be circle-shaped. If the ceramic compound is of paste-like consistency, it may be more suitable to use a rectangularly shaped nozzle opening whose width determines the width of the annular zone in which the flow channels are sealed. The minimum width of the annular zone should correspond approximately to the greatest diagonal of a flow channel so that the annular zone encompasses at least one tier of flow channels. Depending on the requirements of the application, the annular zone can, however, also encompass several tiers of flow channels which necessitates a correspondingly wider nozzle opening. If the nozzle opening is of a rectangular shape, the width of the annular zone to be sealed can be adjusted very simply by axial rotation of the nozzle. Suitable axial rotation of the nozzle during the sealing of the annular zone also enables different plugging widths to be realized on a honeycomb body. The minimum width of the annular zone is then determined by the short side and the maximum width by the long side respectively of the diagonals of the rectangular nozzle opening.

An essential feature of the method according to the present invention resides in guiding the nozzle past the lateral surface of the honeycomb body during the relative movement between honeycomb body and nozzle. This can take place in a simple purely mechanical manner by means of a rolling wheel supported resiliently on the lateral surface or by means of a wheel set or by means of a sliding shoe of any shape. In addition to this direct guiding, the guiding can also be carried out indirectly through a copying system which scans a second honeycomb body of identical cross-sectional geometry. Optical scanning systems for the indirect guiding of the nozzle are also possible, in which the end face contour of the honeycomb body is detected, for example with an optical system by means of a camera and connected image processing system or of a contour-scanning laser beam. Optionally several mutually complementary guidance systems can also be used simultaneously.

The nozzle can in this case be displaced in a radial direction by a suitable control system with simultaneous rotation of the honeycomb body about its longitudinal axis in order to follow the contour of the end face. Alternatively, this indirect guidance also makes it possible, with the honeycomb body stationary, to guide the nozzle alone by an xy-displacement according to the cross-sectional contour of the honeycomb body across the end face.

It is ensured by the method according to the present invention that the annular zone always exhibits an identical clearance from the edge of the honeycomb body across the entire periphery of the honeycomb body. The annular zone is therefore disposed concentrically relative to the periphery of the honeycomb body.

The shape of the annular zone coincides with the cross-sectional shape of the honeycomb body. Only in the case of a honeycomb body of circular cross-section is a circular zone involved. In the case of oval honeycomb bodies the annular zone also has an oval shape.

Usually the annular zone will form directly the edge zone of the honeycomb body and encompass 2 to 5 tiers of flow channels. All the flow channels along the entire periphery of the annular or edge zone can be sealed or else only the flow channels in sub-sections of the annular zone distributed over the periphery. It is an advantage of the method according to the present invention in this case that due to the feeding of the ceramic compound with a nozzle during the sealing or plugging of the edge zone, a soiling of the lateral surface of the honeycomb body is largely prevented.

The sealing of all the flow channels of the edge zone is suitable if raising of the mechanical stability or an improved thermal insulation is to be achieved by this means. The sealing of sub-sections of the edge zone is applied if the honeycomb body is supported in the exhaust system only by a few discrete clips on the two end faces. In this case only the flow channels which after the fitting into the exhaust system are covered by the securing clips will be sealed. In this way the maximum possible cross-sectional area will be kept free for the exhaust gas cleaning.

With the method according to the present invention the flow channels sealed only in sub-sections of the annular zone can be realized in a simple manner by suitable control of the feed of ceramic compound, e.g. by injection pressure. In order to increase the productivity, it is possible in this case and also with an annular zone sealed throughout for several nozzles distributed over the periphery to be used.

According to the present invention the introduction of the ceramic compound with at least one nozzle into the flow channels of the honeycomb body is very flexible. A covering with a covering mask of the flow channels not to be sealed, as described for example in DE 31 09 314 C2, is not necessary. Instead, the guiding of the nozzle past the lateral surface and/or past the end face contour of the honeycomb body guarantees the processing of honeycomb bodies of varying cross-sectional shapes successively without rejigging of the apparatus. Likewise, production variations in the cross-sectional shapes do not present any difficulties.

The relative movement between nozzle and honeycomb body is realized in an important form of execution of the present invention by rotation of the honeycomb body about its cylinder axis, while the nozzle is disposed so as to be displaceable in radial direction, in order to be able to allow for the changes in radius on rotation of the honeycomb bodies. In a further form of execution of the present invention the nozzle is guided around the stationary honeycomb body. Of course, honeycomb body and nozzle can also be moved simultaneously.

The method according to the present invention can be applied in similar manner to ceramic and metal honeycomb bodies with cell densities between 5 and 200 cells/cm$^2$ and is not limited to particular materials for the honeycomb bodies. Thus the method tolerates all common high-temperature-resistant materials used for manufacture of ceramic honeycomb bodies such as, for example, cordierite, mullite, $\alpha$-aluminum oxide, zirconium oxide, titanium oxide, titanium phosphate, aluminum titanate, spodumene, aluminum silicate, and magnesium silicate. Metal honeycomb bodies from stainless steel, Fe—Cr—Al alloys, aluminum and other metals or metal alloys can also be treated.

As ceramic compounds, respectively fillers or plugging material for the sealing or filling of the flow channels, there are used preferably pastes or dispersions of fire-resistant oxides in the form of barely porous powders or their precursor compounds, such as for example hydroxides containing suitable additives such as fibers, organic auxiliaries and inorganic binders, together with wetting and lubricating agents. Silica sol, zirconium oxide sol or special aluminum hydroxides are suitable as inorganic binders. In addition, self-curing, heat-resistant cements with only slight shrinkage are also suitable. A ceramic compound will preferably be used which corresponds in its composition to the coating dispersion for the high-surface metal oxide coating of the honeycomb body.

The introduction of the ceramic compound takes place with advantage prior to the coating of the honeycomb body with the catalytically active coating. Valuable, catalytically active coating material is thereby saved. After the sealing of the flow channels the ceramic compound introduced can be dried at room temperature or increased temperatures of for example 80° to 200° C. Drying of the ceramic compound with microwaves is particularly advantageous, the heating of the honeycomb body being confined in the case of microwaves to the moist ceramic compound. The drying can be followed by a calcination step at 200° to 600° C. for the definitive curing of the ceramic compound. In certain cases a firing operation at temperatures such as are applied in the manufacture of ceramic honeycomb bodies may even be advantageous.

In the case of highly viscous fillers it is possible—particularly in the case of porous ceramic supports with good absorption capability—to dispense with the drying operation described and for the dispersion coating to be carried out directly in succession. This procedure is recommended particularly in the case of self-curing filling material such as ceramic cements or organic curing additives.

Any calcination step required for the curing of the filler takes place suitably, however, simultaneously with the catalytically active coating to be applied later.

In order to guarantee a sufficient thermal-shock resistance of the treated honeycomb bodies, it is necessary particularly with ceramic honeycomb bodies to adjust the thermal expansion coefficients of honeycomb body and fully cured filler to one another. Thermal expansion coefficients of the cured fillers which come to not more than five times, preferably not more than three times, the expansion coefficient of the honeycomb body have proved effective.

With the method according to the present invention the flow channels can be sealed either unilaterally or bilaterally, simultaneously or successively. Sealing of the flow channels on only one side is particularly advantageous. The resulting honeycomb bodies, in combination with a suitable coating technique, prevent valuable coating material from being deposited in the flow channels inaccessible to the exhaust gas intended to be purified. This variant of the method according to the present invention permits, on account of the dropping of the otherwise necessary sealing of the flow channels on the second end face, a very economic fabrication of coated honeycomb bodies for automotive exhaust gas catalysts.

The depth of introduction of the ceramic compounds into the honeycomb body can be adjusted by suitable choice of the viscosity of the compound, of any injection pressure applied and of the rate at which the nozzle is guided along across the annular zone.

The absorptive power and the cell density of the honeycomb body also have an important influence on the viscosity selected for the ceramic compound. Ceramic honeycomb bodies with a high absorptive power for water require a lower viscosity of the filler than metal honeycomb bodies. Likewise, the viscosity of the filler must be reduced with rising cell density.

The person skilled in the art will however be able to determine the above-mentioned parameters by means of a few exploratory preliminary tests. Depths of introduction up to 10 mm are preferred.

If necessary, the flow channels can also be filled completely in one working step from one side. Likewise, it is possible to fill the flow channels partially in one working step from both sides or—in the case of gas-permeable channel walls—to fill them completely.

Although the introduction operation leads in most cases to a cell sealing which is flush with the honeycomb body surface, a deeper penetration of the filler into the cells can be promoted by subsequent blowing with compressed air or by application of an under-pressure. It is also possible to support the introduction operation itself by application of an over- or under-pressure onto the ceramic compound. This is recommended in particular if the ceramic compound possesses a paste-like consistency. On application of an over-pressure the ceramic compound is then pressed into the flow channels. On application of an under-pressure on the opposite end face of the honeycomb body the ceramic compound is sucked into the flow channels.

Further variations and modifications of the foregoing will be apparent to those skilled in the art and such variations and modifications are intended to be encompassed by the claims that are appended hereto.

German Priority Application P 44 24 019.8 filed on 8 Jul. 1994 is relied on and incorporated by reference in its entirety.

We claim:

1. A method for the unilateral or bilateral sealing or filling of flow channels in an annular zone of a cylindrical honeycomb body which is bounded by two end faces having a contour, which form the inlet and outlet face of said honeycomb body, and by an enveloping lateral surface, comprising introducing a ceramic compound into said flow channels in said annular zone of at least one of said end faces by means of at least one nozzle having a nozzle opening, wherein the width of said nozzle opening is at least equal to the greatest diagonal of a flow channel and wherein the sealing or filling of said flow channels is performed by locating the nozzle over said end face and moving said nozzle and said end faces laterally relative to one another during sealing or filling of said flow channels with simultaneous guiding of said nozzle over said end face in said annular zone during said sealing or filling along said lateral surface or along said contour of said end face.

2. The method according to claim 1, further comprising application of an over- or under-pressure onto said ceramic compound during said introducing or after completion of said introducing.

3. The method according to claim 1, wherein said flow channels are sealed by introducing said ceramic compound up to a depth of 10 mm.

4. The method according to claim 1, wherein said flow channels are filled by introducing said ceramic compound along the entire length of said honeycomb body.

5. The method according to claim 1, wherein said flow channels are sealed by said inlet and outlet face successively or simultaneously.

6. The method according to claim 1, wherein said flow channels of said annular zone are sealed or filled only in portions of said annular zone.

7. The method according to claim 1, wherein said annular zone forms the edge zone of said honeycomb body.

8. The method according to claim 1, wherein said ceramic compound introduced into said flow channels is dried by microwaves and optionally cured by calcination to form a cured ceramic compound.

9. The method according to claim 8, wherein the coefficient of thermal expansion of said cured ceramic compound exceeds the coefficient of thermal expansion of said honeycomb body by not more than a factor of 5.

10. The method according to claim 9, wherein said coefficient of thermal expansion of said cured ceramic compound exceeds said coefficient of thermal expansion of said honeycomb body by not more than a factor of 3.

11. The method according to claim 1, wherein said nozzle is guided along past said lateral surface and/or past the contour of said end face or that said honeycomb body is rotated away about its axis below said nozzle.

* * * * *